May 10, 1966　　　J. R. COLSTON　　　3,250,469
PURE FLUID FUNCTION GENERATING SYSTEM
Filed Aug. 5, 1963　　　3 Sheets-Sheet 1
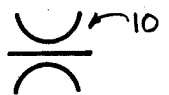
FIG.1
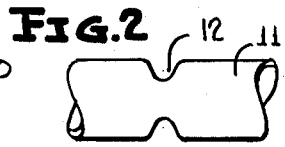
FIG.2
FIG.2A
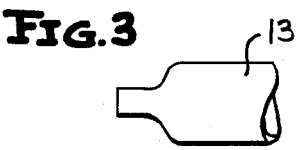
FIG.3
FIG.3A
FIG.4
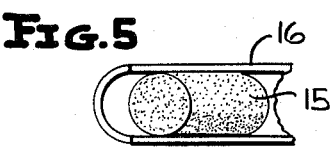
FIG.5
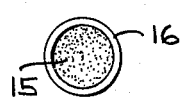
FIG.5A
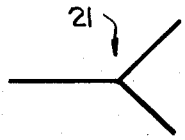
FIG.8
FIG.6
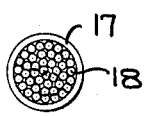
FIG.6A
FIG.7
FIG.7A
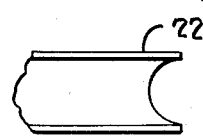
FIG.9
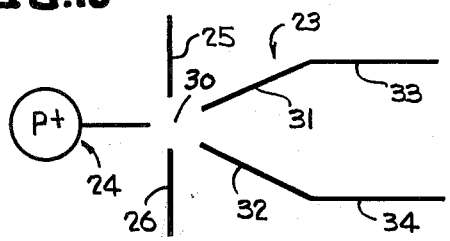
FIG.10
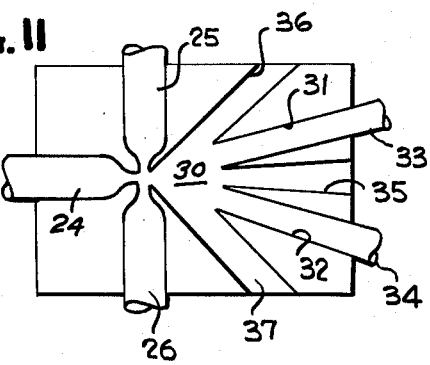
FIG.11
FIG.12
*INVENTOR*
JOHN R. COLSTON
BY *Hurvitz + Rose*
ATTORNEYS

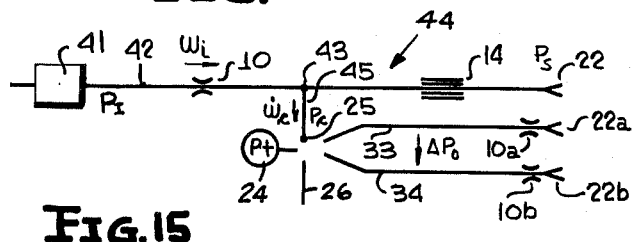
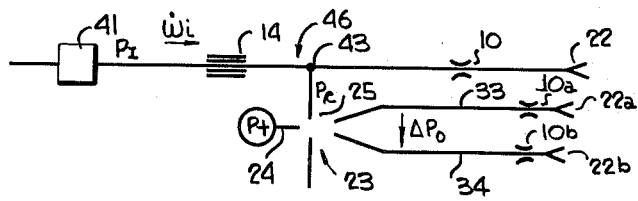
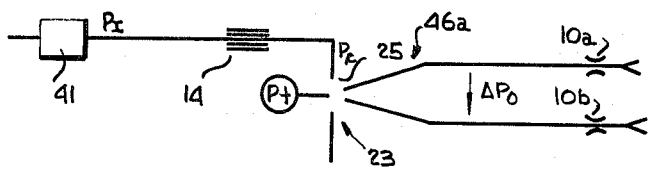
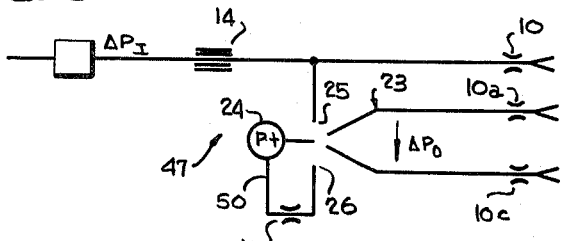
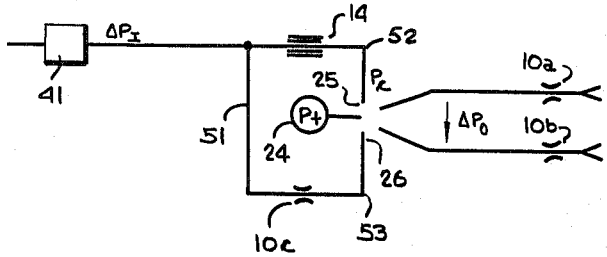

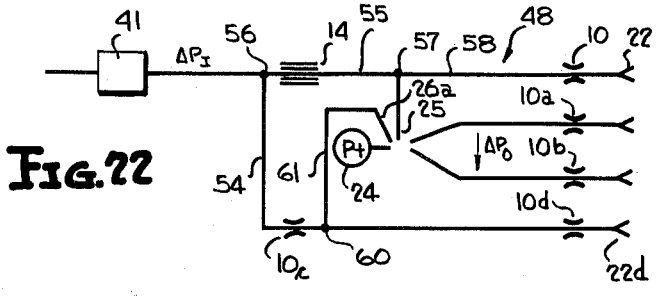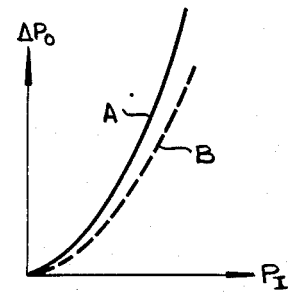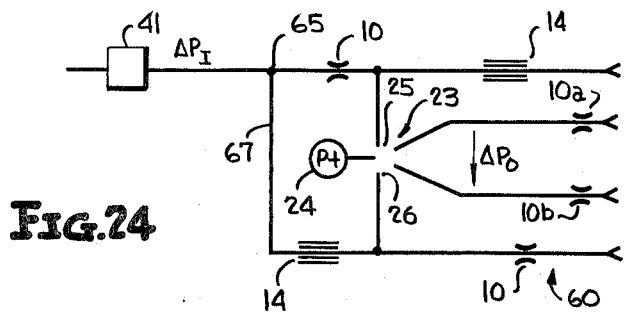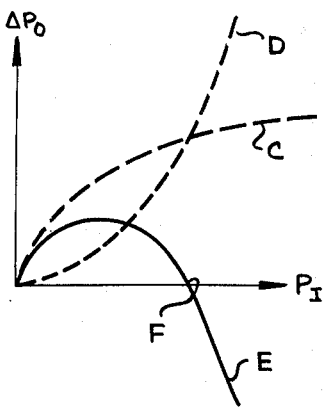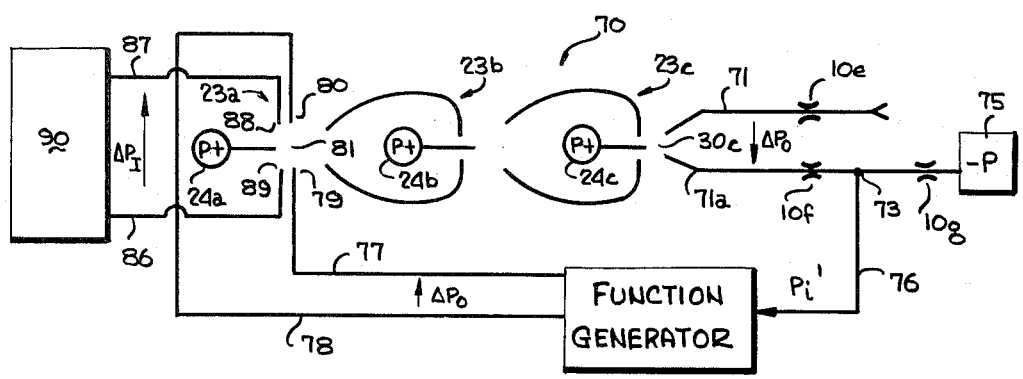

United States Patent Office 3,250,469
Patented May 10, 1966

3,250,469
PURE FLUID FUNCTION GENERATING SYSTEM
John R. Colston, Silver Spring, Md., assignor to Bowles Engineering Corporation, Silver Spring, Md., a corporation of Maryland
Filed Aug. 5, 1963, Ser. No. 299,985
22 Claims. (Cl. 235—200)

This invention relates to pure fluid systems in general and, more specifically, to a pure fluid system capable of producing fluid output signals that are prescribed functions of a fluid input signal supplied to the system.

In pure fluid systems, it may be desirable or essential to provide that the output signal or parameter of the system be a prescribed function of a variable input signal or parameter supplied to operate or control the pure fluid system. Various types of such systems are disclosed herein and are referred to as "pure fluid function generators." It is believed these pure fluid function generators will find use, for example, in pure fluid computers and control systems, and are therefore thought to be important to the further development of the pure fluid amplifying art, in general. As will be apparent to those working in this art, the terms "pure fluid" refer to those fluid systems that function without the use of any moving parts and employ only the working fluid supplied to the system to accomplish the desired results or operations.

The instant invention basically employs an analog type of pure fluid amplifier in combination with two distinct types of flow restrictions to provide various types of function generators capable of closely approximating functions such as square roots, squares, sinusoidal and exponential functions, to mention but a few.

One type of restriction element employed is designated and referred to herein as an "orifice restriction" because it offers a resistance or impedance to fluid flow by means of an orifice or a reduction in the cross-sectional area of a tube or channel through which the fluid flows. A suitable orifice restriction for the purposes of this invention may be provided by a tapered nozzle having "simple orifice characteristics," the term "simple orifice characteristics" being defined in the subsequent detailed description of the invention.

If measurements are taken of incremental increases in weight flow of fluid through an orifice restriction and the pressure drops across the orifice restriction needed to cause incremental increases in weight flow, the resulting curve that is plotted on graph paper (weight flow vs. pressure drop), will, for certain operating pressure ranges, closely resemble the curve of a square root function. It has also been observed that if the pressure drop across the restriction with another simple orifice down stream is measured and plotted on graph paper against increasing pressure applied to the fluid to obtain a greater pressure drop across the restriction, the function generated will be substantially linear for the same operating pressure ranges. These characteristics of orifice restrictions are utilized by the instant invention in a manner which will be described in greater detail subsequently to generate the desired output function for a given fluid input signal.

The second type of restriction element utilized by the present invention is designated and hereafter referred to as a "laminar flow restriction," and may be formed for instance by a series of plates, hollow tubes or rods arranged parallel to the direction of fluid flow, one or more capillary tubes, or by a porous plug inserted in a tube or channel conveying the fluid. If measurements are taken of incremental increases in weight flow through this restriction and the corresponding incremental pressure drops across the restriction, and the results plotted graphically on log paper (weight flow vs. pressure drop), a substantially linear relationship will be observed to exist between the weight flow and pressure drop across this type of restriction. A substantially linear relationship also exists between the pressure drop across the laminar restriction and the pressure applied to the fluid flowing into the restriction.

The orifice and laminar type restrictions are respectively combined by coupling the restrictions together through tubing, and the output of the resulting combination is applied to an analog type of pure fluid amplifier as a fluid control signal. An analog type of pure fluid amplifier comprises; a power nozzle which supplies a power stream into a confined interaction chamber; at least one control nozzle for issuing a control stream essentially transversely of the constricted power stream and in interacting relationship therewith so as to effect amplified displacement of the power stream relative to a pair of fluid receiving output passages or tubes located downstream of the interaction chamber. The displacement of the power stream by the control stream in an analog type of pure fluid; amplifier is linear; that is to say, an essentially linear relationship exists between a change in an output fluid parameter such as pressure or flow for a corresponding change in the respective control fluid parameter supplied to the control nozzle of the analog type fluid amplifier.

The amplified differential output signal that issues from the output passages of the analog type of pure fluid amplifier will be a linear function of the signal supplied to the control nozzle, and according to this invention this latter signal is supplied by the network incorporating the orifice and laminar flow restrictions, respectively. Since the analog amplifier is essentially a linear amplifier there will be a minimum of distortion of the control fluid signal.

An important aspect of this invention is the discovery and utilization of the fact that various functions may be generated by the combination of the analog type of pure fluid amplifier and the orifice and laminar restriction elements, depending upon the arrangement and type of element used.

Broadly, it is an object of the invention to provide a fluid system capable of producing an output signal which is a prescribed function of an input signal applied to the system.

More specifically, it is an object of this invention to provide a pure fluid amplifying system which receives a fluid control input signal from a system embodying in combination, an orifice restriction element and a laminar flow restriction element, the elements being coupled together to receive a fluid input signal of successively increasing or decreasing amplitude and generating prescribed functions for the control of the amplifier from the fluid input signal so received.

Still another object of this invention is to employ a pure fluid function generator in the feedback circuit of an amplifying system so that the latter system generates an output signal which is a prescribed function of the fluid feedback signal.

Yet another object of this invention is to provide a pure fluid function generator which utilizes a control nozzle of an analog type pure fluid amplifier as an orifice restriction and which in conjunction with a laminar restriction causes the output of the amplifier to be a prescribed function of the signal supplied to the laminar restriction and to the control nozzle.

Still another object of tihs invention is to provide a pure fluid function generating system formed by orifice and laminar restriction elements, the elements being coupled together to receive an input signal of successively increasing or decreasing magnitude, and producing an output signal which is a predetermined function of the input signal.

According to this invention, orifice and laminar type flow restriction elements are respectively coupled in series and in parallel arrangements combinations, the restriction elements receiving a fluid input signal of successively increasing or decreasing magnitude. The two types of restriction elements are also connected by means of tubing to a control nozzle of a pure fluid amplifier of the analog type. The characteristic relationships between weight flows and pressure drops across the restrictions are utilized so that the control signal supplied to the control nozzle will be a prescribed function of the increasing amplitude fluid input signal supplied to the combination of restriction elements. The differentials in output pressure across the output passages of the pure fluid amplifier will then be a prescribed function of the increasing amplitude input signal supplied to the combination of restriction elements.

In order to reduce the number of flow restriction elements in the fluid circuit to the control nozzle the orifice of the control nozzle may be used as an orifice restriction element.

The above and still further objects, features and advantages of the present invention will become apparent upon consideration of the following detailed description of several specific embodiments thereof, especially when taken in conjunction with the accompanying drawings, wherein:

FIGURE 1 is a symbolical representation of an orifice type flow restriction element;

FIGURES 2 and 2A are respectively side and end views of one physical embodiment of the symbol as illustrated in FIGURE 1;

FIGURES 3 and 3A are respectively side and end views of another physical embodiment which may be represented by the symbol shown in FIGURE 1;

FIGURE 4 symbolically represents a laminar flow type of restriction element;

FIGURES 5 and 5A are respectively a partial sectional side view and an end view of one possible physical embodiment represented by the symbol illustrated in FIGURE 4;

FIGURES 6 and 6A are respectively a partial sectional side view and an end view of another physical embodiment represented by the symbol shown in FIGURE 4;

FIGURES 7 and 7A respectively illustrate a partial sectional side view and an end view of another possible physical embodiment represented by the symbol shown in FIGURE 4;

FIGURE 8 is a symbolical representation of a tube, passage or channel for venting fluid therein to a region of atmospheric pressure;

FIGURE 9 illustrates a typical physical embodiment represented by the symbol shown in FIGURE 8;

FIGURE 10 symbolically represents a pure fluid amplifier of the analog type;

FIGURE 11 is a plan view of a typical type of pure fluid analog amplifier;

FIGURE 12 is a graphical illustration of the weight flow versus pressure across the two types of flow restriction elements, the orifice type restriction element and laminar type restriction element;

FIGURE 13 is a symbolical representation of a pure fluid square root generating system constructed in accordance with this invention;

FIGURE 14 graphically illustrates a typical square root function output generated by the system shown in FIGURE 13;

FIGURE 15 is a symbolical representation of a square function generator construction in accordance with the principles of the instant invention;

FIGURE 16 graphically illustrates a typical square (parabolic) function generated by the system illustrated in FIGURE 15;

FIGURE 17 symbolically illustrates a modification of the system shown in FIGURE 15 which utilizes the "simple orifice characteristic" of a control nozzle to reduce the number of orifice restriction elements in the system;

FIGURE 18 schematically illustrates a pure fluid exponential function approximator, the fluid output signal of the approximator being essentially an exponential function of the fluid input signal;

FIGURE 19 illustrates a typical exponential function which can be generated by the system illustrated in FIGURE 18;

FIGURE 20 is a modification of the system shown in FIGURE 18 for generating an output fluid signal which is an exponential function of the fluid input signal supplied to the system;

FIGURE 21 illustrates the exponential function obtained by use of the system shown in FIGURE 20;

FIGURE 22 schematically illustrates a pure fluid system for increasing the slope of the exponential output curve shown in FIGURE 21;

FIGURE 23 graphically illustrates the increase in slope of the function illustrated in FIGURE 21 effected by the system shown in FIGURE 22;

FIGURE 24 schematically illustrates a sinusoidal function approximator;

FIGURE 25 illustrates graphically the approximate positive half of a sine wave which can be generated by the use of the system shown in FIGURE 24; and FIGURE 26 schematically illustrates the use of the pure fluid function generator in the feedback circuit of an amplifying system to generate another type function at the output of the amplifying system.

Referring now to the accompanying drawings for a more complete understanding of the instant invention, FIGURE 1 illustrates schematically what will hereinafter be referred to as an "orifice restriction element," the element being designated by reference numeral 10. FIGURES 2 and 2A illustrate a typical physical embodiment of this type of restriction element as comprising, a tube 11 for conveying or transporting fluid supplied to the tube, and an annular constriction 12 formed by the interior walls of the tube 11 to provide an orifice type of restriction element to fluid flow through the tube 11.

FIGURES 3 and 3A illustrate what will hereinafter be referred to as a simple nozzle which may have a "simple orifice characteristic." The term "simple orifice characteristic" in relation to the orifice of a control nozzle refers to control nozzles in which the weight flow of fluid through the orifice is proportional to the square root of the pressure applied to the fluid to force the fluid through the orifice. Thus, when a control nozzle has a simple orifice characteristic and is used in a pure fluid analog amplifier to displace the power stream, there will be negligible or zero flow into or out of the control nozzle when there is zero or essentially ambient pressure in the tube, line or channel connected to the control nozzle. If fluid egresses from the control nozzle, or if there is movement of fluid into the control nozzle from the power stream during operation of the analog amplifier in the absence of a positive or negative pressure signal applied to the control nozzle, the orifice of the control nozzle may not be correctly considered to possess a simple orifice characteristic.

With reference now to FIGURE 12 of the accompanying drawings, there is shown a graph of weight flow (in.³/sec.) versus change in pressure (p.s.i.g.) across a typical orifice restriction element. As shown in this figure, the orifice restriction curve produces a pressure drop across the restriction element which is non-linear and which increases as weight flow increases, or vice versa. As will be evident from a subsequent analytical analysis of an orifice restriction element, the curve obtained is essentially that of a square root function; that is, the weight flow across the restriction is equal to a constant times the square root of the pressure drop across that element. This fact will now be proven analytically.

The general equation for an orifice restriction can be written as:

$$\text{pressure head} = \frac{\dot{X}^2}{2g}$$

where $\dot{X}$ is the vector component of velocity in the direction of flow through the restriction, and $$\text{pressure head} = \frac{\Delta P}{\rho}$$

where:

"$\rho$" is the weight density of the fluid
"$\Delta P$" is the differential in pressure across the restriction.

Therefore:

$$\dot{X}^2 = \frac{2g\Delta P}{\rho}$$

or $$\dot{X} = \sqrt{\frac{2g\Delta P}{\rho}}$$

and $\dot{V} = a\dot{X}$ where:

"V" is the volume of fluid flow
"$a$" is the cross sectional area of the restriction in inches.

$$\dot{V} = a\sqrt{\frac{2g}{\rho}}\sqrt{\Delta P}$$

or $$\dot{W} = \rho\dot{V} = a\sqrt{2g\rho}\sqrt{\Delta P} = K\sqrt{\Delta P}$$

where: $\dot{W}$ is the weight flow of flow through the restriction (in.³/sec.).

It can therefore be shown analytically and graphically that the weight flow of fluid through the orifice restriction is equal to a constant times the square root of the pressure drop across that restriction.

Referring now to FIGURE 4, there is shown a linear or laminar flow type of restriction element designated by the numeral 14. FIGURES 5 and 5A show one possible physical embodiment of such an element as comprising a porous plug 15 which is fitted into a fluid conveying tube or passage 16, the porosity of the plug being such that regardless of the disturbance or vorticity in flow upstream of the plug 15, the flow within the restriction is essentially laminar and the drag on the fluid is a laminar viscous drag.

FIGURES 6 and 6A illutrate another possible physical embodiment which may be properly represented by the laminar flow symbol 14. In this embodiment, a tube 17 in which the fluid is received and conveyed has inserted therein a series of parallel equi-diametrical hollow tubes 18 which reduce the minimum dimension at right angles to the flow in the flow passage, causing a laminar viscous drag. The tubes 18 thereby serve as a linear or laminar flow restriction to fluid flowing therethrough.

FIGURES 7 and 7A illustrate another physical embodiment of a laminar restriction element, designated by the numeral 14 in FIGURE 4. This embodiment comprises a tube 19 in which the fluid is received and conveyed and a plurality of closely spaced-apart flat plates 20 having the ends thereof embedded in the interior walls of the tube 19, the plates 20 serving to produce laminar viscous drag between the plates.

The impedance to flow through the restriction 14 increases as the porosity of the plug 15 is decreased, as the diameter of the tubes 18 are decreased and as the plates 20 are spaced closer together. Conversely, the impedance of the element 14 decreases as the porosity of plug 15 increases, as the diameter of the tubes 18 increases and as the spacing between plates 20 increases.

Referring again to FIGURE 12, and to a typical graphical plot of weight flow versus pressure drop across the laminar restriction. It can be seen that an essentially linear relationship exists when the laminar restriction element 14 is incorporated in the fluid receiving and conveying tube or channel. As is known to those skilled in the art, the linear relationship between weight flow through a laminar restriction and pressure drop across the restriction can be expressed analytically as:

$$\Delta W \cong K'\Delta P$$

where K' is a constant depending upon the laminar viscous drag through the particular laminar restriction element utilized.

Referring now to FIGURE 8 of the accompanying drawings, there is shown schematic representation of a vent for use in the fluid systems of the instant invention, the vent being designated by the numeral 21. A simple form of a vent is an open tube 22 such as shown in FIGURE 9 for venting the fluid flow to an ambient or atmospheric pressure condition or environment.

FIGURE 10 schematically illustrates a pure fluid amplifier of the analog type as it is commonly known and referred to by those working in the art. The amplifier may take the form such as shown in FIGURE 11 or be of some other form as will be apparent to those skilled in the art. Basically this type of pure fluid amplifier comprises a power nozzle 24, a pair of opposed control nozzles 25 and 26, an interaction chamber 30, and plural output passages 31 and 32 located downstream of the interaction chamber 30 the passages 31 and 32 having tubes 33 and 34 respectively threadedly connected therein to receive fluid from the output passages 31 and 32, respectively. The passage 35 may also be provided intermediate the output passages 31 and 32 to receive fringe portions of fluid from the displaced power stream issuing from the power nozzle 24 so that the passages 31 and 32 receive essentially only fluid from the power stream which has been displaced into those passages by control stream flow. Passages 36 and 37 are also provided and vent to an ambient pressure environment thereby maintaining the pressure along the side walls defining the passages 36 and 37 at ambient pressure. The position of the power stream in the interaction chamber 30 will be dependent upon the relative magnitudes of the control jets issuing from the control nozzles 25 and 26. As mentioned hereinabove, either one of the control nozzles, or both of the control nozzles, may be provided with a simple orifice characteristic so that when there is zero signal amplitude in the control nozzle there is zero flow from and into that control nozzle as the power stream issues from the power nozzle 24.

FIGURE 13 illustrates a square root generator or extractor and constructed in accordance with the principles of this invention. The square root generator comprises a source 41 for supplying successively increasing amplitude fluid pressures to a tube 42, to an orifice restriction element 10, and hence to a T connection 43. Extending from the connection 43 are tubes 44 and 45 respectively, the tube 44 having a relatively small impedance restriction 14 therein that terminates downstream in a vent 22. The tube 45 is connected to supply fluid to the control nozzle 25.

The control nozzle 25 provides control stream flow for the pure fluid amplifier which includes a power nozzle 24, orifice restriction elements 10a and 10b in the output tubes 33 and 34 respectively, and vents 22a and 22b, respectively which discharge fluid egressing from the amplifier to ambient pressure. The control nozzle 26 may or may not be provided in the amplifier 23 as desired, but if it has been incorporated in the amplifier design and construction, the control nozzle 26 should preferably possess a simple orifice characteristic so that there will be no fluid ingress or egress into or egress from the control nozzle 26.

The laminar restriction element 14 preferably provides a low impedance to flow therethrough so that as successively increasing fluid inputs are supplied by the source 41 to the tube 42 under a linearly increasing pressure, $P_i$, the weight flow, $\dot{W}_i$, of the fluid through the orifice restriction 10 will produce a relatively large pressure drop across that restriction, and the back pressure within the junction 43 caused by the pressure drop across the element 14 will be negligible. The equations defining the operation of this system can therefore be written as follows:

From the orifice equation, (1) $\qquad \dot{W} = K\sqrt{\Delta P}$ where $K = a\sqrt{2g\rho}$ Since $P_i \gg P_c$ and $P_i \gg P_v$ $$\dot{W} \cong K\sqrt{P_i - P_c}$$

and $$P_i - P_c \cong P_i - P_v$$

where $P_i - P_v$ is the negligible pressure drop across laminar restriction element 14, when compared to the pressure drop across the orifice restriction 10. Since $\dot{W}_i \gg \dot{W}_c$, the weight flow through 14 is approximately equal to $\dot{W}_i$ (2) $\qquad P_c - P_v = K_1 \dot{W}_i$ where $K_1$ is dependent upon the resistance of laminar viscous drag through the laminar restriction 14 and is equal to $\Delta P / \Delta \dot{W}$ across the restriction. Substituting $P_c - P_v / K$ for $\dot{W}_i$ in (1) yields:

(3) $\qquad P_c - P_v = K K_1 \sqrt{P_i - P_v}$ which simplifies to $$P_c = K K_1 \sqrt{P_i}$$

since $P_v = 0$, this being the reference or ambient pressure. For a proportional amplifier, $$P_0 = K_2 P_c$$

where $K_2$ is the amplifier gain for a single amplifier and has a value $\Delta P_0 / \Delta P_{in}$ which may vary in accordance with a particular amplifier design.

Therefore $$\Delta P_0 = K K_1 K_2 \sqrt{\Delta P_i}$$

It has been experimentally observed, for example, that with dry air at 80° F. as the working fluid, for relatively low values of $\Delta P_i$, that is values of pressure less than five inches of water, and a porous plug for the element 14, the relationship between $\Delta P_i$ and $\Delta P_0$ will be $$\Delta P_0 = K K_1 K_2 \sqrt{\Delta P_i}$$

The combined values of $KK_1$ and $K_2$ under these conditions was found to be approximately 0.31, with pressures in pounds per square inch.

In summary, for the conditions, $\dot{W}_i$ much greater than $\dot{W}_c$, and $P_i$ much greater than $P_c$, a plot on graph paper of the differential in pressure output across the vents 22a and 22b of the fluid amplifier versus increasing pressure inputs supplied by the incrementally increasing pressure source 41, will generate a square root function such as shown in FIGURE 14 and therefore the differential in pressure across the vents 22a and 22b of the amplifier will equal a constant times the square root of the differential input pressure over defined pressure ranges.

Reference is now directed to the pure fluid function generator 46 illustrated in FIGURE 15 of the drawings. By interchanging the positions of the orifice restriction element 10 and the laminar flow restriction element 14, and by increasing the resistance to flow of the laminar flow restriction element 14 by decreasing the size of the tubes or the porosity of the plugs or the separation between the plates as the particular physical embodiment may assume, it is possible to generate a square function instead of a square root function. With a relatively high impedance element 14 most of the pressure drop will occur across the element 14 and a negligible amount will appear across the orifice restriction 10 so that $P_i$ will be very much greater than $P_c$, and $\dot{W}_i$ will be very much greater than $\dot{W}_c$. In the embodiment shown in FIGURE 15 it may be assumed that the orifice of the control nozzle 25 does not have simple orifice characteristics; that is, there is a possibility that fluid will enter or bleed from the control nozzle 25 in the absence of a pressure signal supplied to the control nozzle 25 when the amplifier 46 is issuing a power stream. In order to illustrate how a square function is generated by the system shown in FIGURE 15, the following analysis can be made.

(1) $\qquad \dot{W}_i = C(P_i - P_c)$ where $$C = \frac{\Delta \dot{W}}{\Delta P}$$

across the laminar restriction element.

(2) $\qquad P_c - P_v = C_1 (\dot{W}_i)^2$ where $$C_1 = \frac{1}{a^2 2 g \rho}$$

(3) $\qquad P_i - P_c \cong P_i - P_v$ since $P_i \gg P_c$ and $P_v = 0$, substituting in Equations 1, 2 and 3 yields:

(4) $\qquad P_c - P_v = C_1 [C(P_i - P_c)]^2$
$\qquad\qquad P_c = C_1 C^2 (P_i)^2$ Because of the linear relationship between $P_0$ and $P_c$ for a proportional fluid amplifier $$P_0 = C_2 P_c$$

where $C_2$ is the gain of the amplifier.

Therefore:

$$\Delta P_0 = C C_1 C_2 (\Delta P_i)^2$$

It can therefore be seen in FIGURE 16 that the function which is generated by the system 46 when plotted on graph paper, approximates a square function. Therefore, the differential in pressure output between the vents 22a and 22b of the square function generator 46 can be expected to closely approximate the square function illustrated in FIGURE 16.

As mentioned hereinabove in relation to the embodiment shown in FIGURE 15, the control nozzle 25 of that embodiment may not have simple orifice characteristics. However, if the nozzle is designed so that air does not enter or leave the nozzle when there is an ambient pressure condition in the nozzle when the power nozzle 24 of the amplifier 23 is issuing a power stream, then the resulting system may be simplified as illustrated in FIGURE 17. In that system referred to by numeral 46a, the control nozzle 25 having simple orifice characteristics serves the function of the orifice restriction element 10 illustrated in FIGURE 15, and therefore that latter element may be eliminated from the system. The system shown in FIGURE 17 will also generate a close approximation to the square wave function illustrated in FIGURE 15.

Referring now to FIGURE 18 of the accompanying drawings, there is shown another embodiment of the instant invention designated by the numeral 47, which is similar to that illustrated in FIGURE 15, but additionally includes a bias to the pure fluid amplifier 23 by means of the control nozzle 26. This bias is provided by a tube 50 wich communicates with a constant pressure supply such as the power nozzle 24 so as to receive a quantity of fluid from that nozzle and an orifice restriction 10c which is positioned between the power nozzle 24 and the upstream end of a control nozzle 26 to provide a pressure drop of a magnitude sufficient to provide the desired bias control stream which egresses from the control nozzle 26 in opposition to the control stream issuing from the control nozzle 25. Since the pressure of the fluid egressing from the power nozzle 24 will be essentially constant, the bias provided by the fluid issuing from the control nozzle 26 will be under constant pressure and acting in opposition to displace the power stream against the action of the fluid egressing from the control nozzle 25.

With reference to FIGURE 19, it can be seen that the constant bias will be provided by the constant pressure drop which occurs across the orifice restriction 10c and is negative in sense of application since the fluid egressing from the control nozzle 26 opposes that issuing from the control nozzle 25. As a result of this negative bias, the ordinary square root function which would be generated by the system, were it identical to that shown in FIGURE 16, is shifted to the right from the dotted line position to the solid line position as shown in FIGURE 19, and the slope of the cure for any one value of $\Delta P_0$ is increased For relatively small range of values of pressure input it has been observed that the portions of the resulting curve approximate a specific exponential function, with an exponent greater than 2.

FIGURE 20 of the accompanying drawings illustrates a system 47a which is essentially a modification of the system 47 shown in FIGURE 18 in that it provides that the bias be a linear function of the input pressure corresponding to the linear increase in pressure produced by the source 41. In this embodiment, a control nozzle 25 is formed with a simple orifice characteristic in order to simplify the resulting system and the bias pressure received by the control nozzle 26 is obtained from the input rather than the power nozzle, as was the case in the embodiment shown in FIGURE 18. Since the input pressure supplied by the source 41 increases linearly in amplitude with respect to $P_1$, the flow through the control nozzle 26 increases in amplitude to oppose the increasing flow of liquid egressing from the control nozzle 25. The resistance of the laminar restriction element 14 is great enough so that most of the pressure drop occurs across that restriction. The resulting function which can be obtained experimentally and analytically is plotted on graph paper and illustrated by FIGURE 21. For relatively small values of pressure input the slope of the curve as indicated by the solid line closely approximates that at a cubic equation or another exponential function over a portion of the curve.

The slope of the function becomes more linear if $P_i$ is not much greater than $P_c$ since in this case the flow $W_1$ will not be primarily controlled by the laminar restriction element 14. The slope of the curve may be further modified by introducing an attenuated input pressure as a secondary control pressure to the amplifier 23 from a suitable source (not shown).

In the event the control nozzles 25 and 26 do not have simple orifice characteristics it may then be necessary to provide a pair of orifice type restrictions and vents which would be connected to the junctions 52 and 53 respectively, in the same manner that the orifice restriction element 10 and the vent 22 are connected to the junction 43 in the system shown in FIGURE 15. However, ordinarily the control nozzles 25 and 26 can be easily designed to have simple orifice characteristics and therefore the need for providing additional fluid tubing downstream of the respective junctions 52 and 53 may be obviated.

FIGURE 22 illustrates a further modification of the pure fluid system shown in FIGURE 20 for increasing the slope of the function shown in FIGURE 21 of the drawings, the system being designated by numeral 48.

As shown in FIGURE 22, the parameter restrictions 14 and the orifice 10c essentially provide a pressure divider to fluid entering the tubes 54 and 55 from the source 41 of essentially linearly increasing pressure. The connection 56 is designed so that both tubes 54 and 55 receive substantially the same pressure from the source 41.

Fluid entering the tube 55 further divides upon reaching the connection 57 into a control nozzle 25 and into the tube 58 which includes an orifice type restriction 10 and a vent 22. Similarly, the tube 54 joins the tubes 61 and 62 at the connection 60, the tube 61 supplying fluid to a control nozzle 26a which directs fluid to displace the power stream issuing from the power nozzle 24 in the same direction as the control stream issuing from the control nozzle 25. The tube 62 also includes an orifice type restriction 10d and a vent 22d.

The tubes 58 and 62 and the associated orifice restriction elements and vents may be eliminated from the system 48 shown in FIGURE 22 if the nozzles 25 and 26a have simple orfice characteristics, and therefore the embodiment illustrated in this figure may be utilized when the control nozzles 25 and 26a do not have simple orifice characteristics.

In the system 48, the laminar restriction element 15 and the orifice restriction element 10 respectively combine in the same manner as discussed in the embodiment illustrated in FIGURE 18 with the control nozzle 25 to generate a square function output pressure difference from a predetermined pressure input. The pressure drop across the orifice 10c also increases linearly with an increase in $P_i$ and thus the bias provided by the control nozzle 26a is now a linear function of the input pressure supplied by the source 41 to the junction 56. The bias provided by the nozzle 26a is positive since fluid egressing therefrom aids the displacement of the power stream egressing from the power nozzle 24 in the amplifier 23 so that the resultant curve A shown by a solid line in FIGURE 23 is now displaced to the left of the square function curve B shown by dotted lines. By the use of the system illustrated in FIGURE 22, it is therefore possible to increase the slope of the square function an amount dependent upon the positive bias applied by fluid egressing from the nozzle 26a.

The pure fluid system illustrated in FIGURE 24 and referred to by the numeral 60 may be regarded essentially as the combination of the square root generator shown in FIGURE 13, and the square function generator shown in FIGURE 15, with the inputs thereof connected at a common junction 65. The system 60 is designed such that equal pressures exist in lines 66 and 67 from the input pressure supplied by the source 41, and fluid flows through the resistances 10 and 14, respectively, provided in the tubes 66 and 67. For reasons discussed in detail in relation to the square root generator shown in FIGURE 13, and the square function generator shown in FIGURE 15, the control nozzle 25 will issue a control stream against a power stream egressing from the power nozzle 24 to produce a square root function as shown by the dotted lines in FIGURE 25 and designated by the letter C, whereas the fluid egressing from the control nozzle 26 will tend to displace the power stream issuing from the power nozzle 24 into the square function curve designated by letter D. Since the control nozzles 25 and 26 act in opposition to each other, the resulting displacement of the power stream in the amplifier 23 will be the sum of the two functions, designated by the letter E in FIGURE 25. The portion of the curve E between the origin of the axes and the point F is approximately a positive half cycle of a sine wave.

Any of the function generators described in detail hereinabove may be employed in a feedback system 70 shown in FIGURE 26 of the drawings so that the system generates another predetermined type of function. System 70 comprises three pure fluid amplifiers of the analog type designated by numerals 23a, 23b and 23c, respectively, the amplifiers being cascaded to produce a high gain. The techniques involved in the construction and design of the various stages needed to produce a particular output gain are known to those working in the art. The amplifier 23c discharges fluid from its power nozzle 24c into the output passages 71 and 71a, respectively, the quantity of fluid received by each output passage being a function of power stream displacement in the interaction chamber 30c by the control stream. The output passage 71 has an orifice restriction 10e therein and vents to ambient pressure. The output passage 71a is provided with orifice restrictions 10f positioned upstream of a junction 73 to which tubes 74 and 76 are connected to receive fluid from passage 71a. An orifice restriction 10g is formed in the tube 74 between the junction 73 and a source of pressure, P—, designated generally by the numeral 75, the pressure of the source 75 being negative with respect to vent pressure.

The source of negative pressure 75 will maintain the junction 73 at substantially zero pressure or at some other predetermined value of pressure for a predetermined flow from the passage 71a. Thus, for a certain displacement of power stream issuing from the power nozzle 24c, by a predetermined control fluid signal the pressure at the junction 73 may be maintained at either ambient pressure or some negative pressure by the negative pressure source 75. The tube 76 is connected to supply an input fluid stream to the function generator 72. It will be evident that in the function generating systems described hereinabove, the tube 76 would be connected to the tube receiving the output from the variable pressure supply 41.

Tubes 77 and 78 are connected to the output passages of the analog amplifier incorporated in the function generator 72, and therefore the pressure drop $\Delta P_0'$ as indicated will appear across these tubes. Tubes 77 and 78 are connected to control nozzle 79 and 80, respectively. Each tube 86 and 87 receives fluid at some input pressure from a source 90. The fluid pressure in the tube 77 attempts to deflect the power stream in the same direction as the pressure in the tube 86, whereas the pressure in the tube 78 attempts to deflect the power stream in the same direction as the pressure of the fluid in tube 87. The combined pressures at control nozzles 88 and 89, and 79 and 80 deflect the power stream as a function of $$(\Delta P_1 - \Delta P_0')$$

where $\Delta P_1$ is supplied by the source 90 and $\Delta P_0'$ is supplied by the function generator 72. The power stream is emitted from nozzle 24a. If it is assumed that the square root generator 40 is employed as the function generator 72 the displacement of the power stream will be at least partially governed in accordance with increases in pressure which correspond to the output of the square root generator as shown in FIGURE 15.

Since the function generator 72 is a square root generator the fluid signal which is fed back to the fluid amplifier 23a will be approximately the square root of the fluid signal received from the tube 76.

The square root of the signal received by the tube 76 will be applied to the control nozzles 79 and 80 and the input pressure signal $\Delta P_I$ will be applied to nozzles 88 and 89 as shown in FIGURE 26. The displacement of the power stream in the amplifiers 23a, 23b and 23c will then vary approximately as the square of the function received from the pressure source 90. Thus the output pressure, $\Delta P_0$, between the output passages 71a and 71 will vary approximately as the square of $\Delta P_I$, the function from the input source 90.

The particular pure fluid function generator employed in the feedback loop of the system 70 will ordinarily be a matter of choice governed by the output pressure signal desired in the output passages 71 and 71a.

While I have described and illustrated several specific embodiments of my invention, it will be clear that variations of the details of construction which are specifically illustrated and described may be restorted to without departing from the true spirit and scope of the invention as defined in the appended claims.

What I claim is:

1. A pure fluid function generator comprising a pure fluid amplifier including a power nozzle for issuing a power stream into said amplifier and at least one control nozzle angularly disposed with respect to said power nozzle, said control nozzle being constructed such that the flow of control fluid therethrough is proportional to the square root of the differential in pressure applied to the control fluid; fluid supply means for supplying a predetermined pressure signal to said control nozzle; and a laminar type flow restriction element coupled between said supply means and said control nozzle for producing a pressure drop which is a linear function of the weight flow of fluid through said element, said element and said control nozzle in combination generating a substantially square function of values of pressure of said predetermined pressure signal so that the output of said pure fluid amplifier is substantially a square function of the pressure signal supplied to said control nozzle.

2. A pure fluid function generator comprising, a pure fluid amplifier of the analog type, the amplifier including a power nozzle for issuing a power stream into said amplifier and first and second substantially opposed control nozzles for effecting amplified displacement of said power stream in said amplifier, output passages positioned downstream of said power nozzle for receiving the fluid stream egressing therefrom, fluid supply means for supplying a predetermined input pressure signal to the first control nozzle; function generating means coupled between said first control nozzle and said supply means for generating the square of pressure values of said input signal, means for conveying a portion of the fluid supplied to said power nozzle to the second control nozzle, and orifice restriction means in the means for conveying fluid to said second control nozzle for producing a pressure drop which is a linear function of fluid flow therethrough, said second control nozzle thereby issuing a control stream of predetermined magnitude in opposition to the control stream issuing from said first control nozzle so that the pressure differences between the output passages of the amplifier is a function of the differentials in pressure between the control streams.

3. The pure fluid function generator as claimed in claim 2 wherein said function generating means comprises a series combination of a laminar type flow restriction element and an orifice restriction element, the orifice restriction element having simple orifice characteristics.

4. A pure fluid function generator comprising a pure fluid amplifier, said amplifier including a power nozzle for issuing a power stream into said amplifier, first and second control nozzles for issuing control streams in interacting relationship with the power stream for effecting amplified displacement of the power stream in said amplifier, plural output passages for receiving the displaced power stream, said amplifier being constructed so that the differentials in pressures between said output passages is substantially a linear function of the differential in pressure applied by the control streams for effecting displacement of the power stream; flow restriction means for producing predetermined pressure drops across said output passages; supply means for supplying a predetermined input fluid pressure signal to said control nozzles; and exponential function generating means coupled between said supply means and said control nozzles for generating a control pressure signal for each control nozzle which is substantially a prescribed function of the pressure signal received from said supply means.

5. The function generator as claimed in claim 4 wherein said function generating means comprises a laminar restriction element and an orifice restriction element, one restriction element coupled in series with the first control nozzle and the other restriction element coupled in series with the second control nozzle.

6. The pure fluid function generator as claimed in claim 5, wherein each control nozzle is constructed so that the weight flow of control fluid therethrough is proportional to the square root of the differential in pressure supplied to the control fluid.

7. The pure fluid function generator as claimed in claim 5 wherein said first and second nozzle are positioned to issue substantially opposing control streams against the power stream.

8. The pure fluid function generator as claimed in claim 5 wherein each control nozzle is positioned to issue a fluid control stream at an angle to the direction of power stream movement, but in substantially the same direction of power stream displacement.

9. A pure fluid function generator comprising in combination, an analog type pure fluid amplifier including power nozzle for issuing a power stream and two pairs of control nozzles, of which nozzles in each pair are angularly disposed with respect to each other for issuing control streams for displacing the power stream issuing from said power nozzle by interaction therewith, and plural output passages located downstream of said power nozzle for receiving portions at the displaced power stream; a source of fluid supply signals for one set of control nozzles; first function generating means coupled to one set of control nozzles of said two pairs and said source for generating one type of function from the supply signal, and second function generating means coupled to the other set of control nozzles of said two pairs for generating another type of function from the feedback signals, so that the output signal in the output passages of said pure fluid amplifier is the combination of both function generating means.

10. The pure fluid function generator as claimed in claim 9, wherein said function generating means comprises the combination of an orifice restriction and a laminar flow restriction.

11. A pure fluid function generator comprising in combination a pure fluid amplifier including means for issuing a power stream into the amplifier, fluid output means for receiving the power stream and producing fluid output signals and fluid control means for issuing a fluid control stream into intercepting relationship with said power stream so as to displace said power stream as a function of said control stream, means for generating a fluid input signal, a pure fluid resistance having a generally linear weight flow versus pressure characteristic, a fluid element having a flow characteristic such that the weight flow varies as the square root of the pressure drop thereacross, and means interconnecting said fluid resistance, said fluid element, said fluid control means and said means for generating such that said fluid output signals vary as an exponential function of variations in said fluid input signal.

12. A pure fluid function generator comprising in combination a pure fluid amplifier including means for issuing a power stream into the amplifier, fluid output means for receiving the power stream and producing fluid output signals and fluid control means for issuing a fluid control stream into intercepting relationship with said power stream so as to displace said power stream as a function of said control stream, means for generating a fluid input signal, a pure fluid resistance having a generally linear weight flow versus pressure characteristic, a fluid element having a flow characteristic such that the weight flow varies as the square root of the pressure drop thereacross, means for developing fluid signals for application to said fluid control means, said means for developing including means interconnecting said fluid resistance, said fluid element and said means for generating such that the power stream is deflected as an exponential function of said fluid input signal.

13. The combination according to claim 12 wherein said exponential function is a square root function.

14. The combination according to claim 12 wherein said exponential function is a square function.

15. A pure fluid function generator comprising in combination a pure fluid amplifier including means for issuing a power stream into the amplifier, fluid output means for receiving the power stream and producing fluid output signals and fluid control means for issuing a fluid control stream into intercepting relationship with said power stream so as to displace said power stream as a function of said control stream, means for generating a fluid input signal, a pure fluid resistance having a generally linear weight flow versus pressure characteristic, a fluid element having a flow characteristic such that the weight flow varies as the square root of the pressure drop thereacross, said fluid resistance and said fluid element being connected in series between said means for generating and a reference presure and means connecting said control means to receive a portion of the fluid flowing from one of said resistance and said element to the other.

16. The combination according to claim 15 wherein said fluid element is disposed between said means for generating and said fluid control means.

17. A pure fluid function generator comprising in combination a pure fluid amplifier including means for issuing a power stream into the amplifier, fluid output means for receiving the power stream, the power stream being deflectable by a control stream so as to vary the quantities of fluid received by said output means as a function of the control stream, a pure fluid resistance having a generally linear weight flow versus pressure characteristic, a fluid element having a flow characteristic such that the weight flow through said element varies as the square root of the pressure drop thereacross, means for producing a fluid input signal, and means interconnecting said means for producing, said fluid element and said fluid resistance such as to produce a fluid flow which is an exponential function of said input signal and means for employing said fluid flow as the control stream for said fluid amplifier.

18. The combination according to claim 17 wherein said fluid element comprises a control nozzle for said fluid amplifier.

19. The combination according to claim 12 further comprising a further fluid signal which varies as a linear function of said input signal, means for applying to said amplifier in opposition to said first-mentioned control stream whereby said exponential function is a cubic function.

20. The combination according to claim 17 further comprising means for generating a second control stream opposed to said first control stream, a flow resistance having a generally linear weight flow versus pressure characteristic between said means for producing and said means for generating and wherein said fluid element is connected between said means for producing and said means for employing whereby said exponential function approximates a half of a sine wave.

21. The combination according to claim 16 wherein said fluid amplifier comprises a second fluid control means for issuing a stream of fluid opposed to the stream of fluid issued by said first-mentioned control means, a second fluid resistance and a second fluid element connected in series, said fluid resistance being connected between said means for generating and said second fluid control means and said second fluid element being connected between said second fluid control means and said reference pressure.

22. The combination according to claim 17 further comprising another fluid amplifier, having input channels and output channels, means connecting said fluid output means of said first-mentioned fluid to said input channels, and means connecting said fluid resistance and said fluid element to receive fluid input signals from at least one of said output channels of said another fluid amplifier.

(References on following page)

References Cited by the Examiner

UNITED STATES PATENTS

| | | | |
|---|---|---|---|
| 2,322,018 | 6/1943 | Huber | 73—202 |
| 2,439,723 | 4/1948 | Engdahl | 73—196 |
| 2,592,569 | 4/1952 | Henderson | 73—211 |
| 2,929,248 | 3/1960 | Sprenkle | 73—211 |
| 2,992,559 | 7/1961 | Martz et al. | 235—200 X |
| 3,018,041 | 1/1962 | Bidwell | 235—200 |
| 3,062,271 | 11/1962 | Rignsdorp et al. | 235—200 X |
| 3,072,326 | 1/1963 | Rohmann et al. | 235—200 |
| 3,103,814 | 9/1963 | Broeckhuysen et al. | 73—202 |
| 3,122,165 | 2/1964 | Horton | 235—201 |
| 3,155,825 | 11/1964 | Boothe | 235—201 |

FOREIGN PATENTS

| | | |
|---|---|---|
| 674,665 | 11/1963 | Canada. |
| 136,962 | 1961 | Russia. |

OTHER REFERENCES

Aizerman: "The Realization of Non-Linear Algebraic Operations," New Developments in Pneumatic-Hydraulic Automation, pages 15–19. Library No. TJ 840 A 5. (Copy in Technical Library.)

Mamzic, C. L.: "Using Pneumatic Analog Computing Elements for Control," Control Engineering, April 1961, pages 105–110.

LEO SMILOW, *Primary Examiner.*

W. F. BAUER, *Assistant Examiner.*